United States Patent [19]

Ambros et al.

[11] Patent Number: 5,078,914

[45] Date of Patent: Jan. 7, 1992

[54] RESISTANCE PASTE AND RESISTANCE LAYER PRODUCED THEREFROM

[75] Inventors: Peter Ambros, Leutershausen; Kurt Berger, Steinach, both of Fed. Rep. of Germany

[73] Assignee: Preh-Werke GmbH & Co. KG, Saale, Fed. Rep. of Germany

[21] Appl. No.: 415,655

[22] Filed: Oct. 2, 1989

[30] Foreign Application Priority Data

Oct. 3, 1988 [DE] Fed. Rep. of Germany ....... 3833555

[51] Int. Cl.$^5$ .............................. A01B 1/06
[52] U.S. Cl. .................................... 252/511
[58] Field of Search ............ 252/511; 523/468; 524/495, 496

[56] References Cited

U.S. PATENT DOCUMENTS 4,557,860 12/1985 Disalvo et al. ..................... 252/512
4,880,570 11/1989 Sanborn et al. ..................... 252/511

Primary Examiner—Josephine Barr
Attorney, Agent, or Firm—Wegner, Cantor, Mueller & Player

[57] ABSTRACT

In a resistance paste for the production of electric resistors consisting of a polymer binding there are dispersed electrically conductive particles, solvents and additives; in order to produce resistance layers which are electrically stable and resistant to organic substances such as fuels and oils within a temperature range of from −55° C. to +160° C., more than half of the solids contained in the polymer binder consists of a mixture of
   a) fully etherified melamine resin,
   b) polyester resin containing hydroxyl groups and
   c) an acidic catalyst.

16 Claims, No Drawings

RESISTANCE PASTE AND RESISTANCE LAYER PRODUCED THEREFROM

BACKGROUND OF THE INVENTION

The invention relates to a resistance paste consisting of a polymer binder in which there are dispersed electrically conductive particles, solvents and additives. Further, the invention relates to a resistance layer produced from such a resistance paste.

There are known polymer thick-film resistance pastes having a thermoplastic polymer as binder (cf.iee productronic, vol. 29, 1984, No. ½, pages 35/36). Printed layers made from such a resistance paste can be cured at low temperatures. Under the influence of temperatures exceeding 80° C., however, the resistance value is no longer stable. The resistance value increases as the temperature rises, until the electrical conductivity of the layer is interrupted as a result of the melting of the binder. Such layers are unsuitable for processing, e.g. by way of the reverse laminating process (cf. German Application DE-OS 33 22 382), as the generation of heat and pressure necessary for relaminating the layer from an intermediate member onto the final substrate causes the binder component to soften and smear the layer.

There are also known resistance materials having a duroplastic binder component (cf. iee productronic, vol. 29, 1984, No. ½, pages 35/36). Their resistance value decreases as the curing temperature or the curing time, respectively, increases until excessive thermal influence brings about the destruction of the binder in the layer due to thermal decomposition.

The electric stability of such resistance layers may be better than that of thermoplastic resistance layers. A disadvantage, however, is the high curing temperature between 180° C. and 230° C. required in such cases, as the number of possible substrates to be applied to the layer is limited due to the high curing temperature.

German Application DE-OS 21 07 424 describes a layer containing phenolic resin and melamine resin.

German Patent DE-PS 31 48 680 describes a binder having melamine resin, alkyd resin and epoxide resin as components. The useful life of a resistance layer produced therefrom is prolonged by adding a vinyl chloride copolymer. This vinyl chloride copolymer reduces the friction coefficient of the resistance layer, so that the latter is only slightly stressed by the sliding movement of a resistance layer tap.

It has been found that resistance layers made from the known resistance pastes are not resistant to various organic substances like fuels and oils. In such cases of utilization, the resistors would have to be protected by expensive sealing materials.

SUMMARY OF THE INVENTION

It is an object of the invention to provide a resistance paste of the kind described above, which resistance paste maintains its processable consistency for a long period and from which resistance paste a resistance layer can be produced which, being used as fixed resistor or variable resistor, is electrically stable and resistant to organic substances such as Diesel fuel, gasoline, hydraulic oil and the like within a temperature range of from −55° C. to +160° C.

The above object is achieved according to the invention by providing that more than half of the solids contained in the polymer binder consists of a mixture of:

a) fully etherified melamine resin,
b) polyester resin containing hydroxyl groups and
c) an acidic catalyst.

The resins used in the binder should be available in dissolved form (e.g., lacquers) and, after polymerization, form a duroplastic material.

Suitable etherified melamine resins include especially those etherified with $C_1$–$C_6$-alkyl groups and preferably methoxy and ethoxy ethers. Preferred particularly are the melamine-methylol alkyl ether resins. A preferred methoxy derivative is hexamethoxymethylmelamine.

Suitable polyester resins include linear and/or branched saturated polyester resins containing hydroxyl groups and saturated polyesters containing hydroxy and carboxyl groups. Typically, these are resins recognized as desirable complements to melamine resins for purposes of lattice-like polymerization.

The melamine resin portion ensures the desired stability within a temperature range of from −55° C. to +160° C. What is achieved by using fully etherified melamine resin is that the melamine resin portion is cross-linked and thus is not already cured by thermal influence alone but only by the additional influence of a catalyst that is acidic, i.e. that sets free protons. The catalyst is, for example, prepared from an organic sulfonic acid.

The polyester resin portion in the mixture determines the hardness or the plasticity of the layer. If the resistance layer is used as a fixed resistor, a certain plasticity is desirable. The hydroxyl groups of the polyester resin are required for cross-linking the polyester resin with the melamine resin. The melamine resin in combination with the polyester resin makes the resistance layer resistant to organic substances such as fuels or oils.

In a preferred embodiment of the invention, the acidic catalyst setting free protons is a non-ionogenically blocked catalyst. This catalyst sets free acidic groups only at a temperature of about 110° C. and above, which acidic groups initiate the cross-linking of the etherified melamine resin. At temperatures below 110° C., due to the blocking, the catalyst, in most cases, has a neutral pH value. Thus, the cross-linking of the melamine resin does not set in already at such temperatures. This is particularly favorable for the processability of the resistance paste, for, as a result, the resistance paste remains in a processable condition for a long period. At room temperature, the mixed resistance paste has been shown to have a shelf life of half a year and, when stored at +4° C., to have a processability of several years. The blocked catalyst is usually added already when the resistance paste is being prepared, while a non-blocked catalyst, as a rule, is added to the resistance paste immediately before it is processed.

Preferred catalysts are non-ionogenically blocked acid catalysts of high stability at room temperature, but which show high reactivity in catalyzing lattice-like polymerization at temperatures above 110° C. Among the suitable catalysts are aryl sulfonic acids such as toluenesulfonic acid, dinonylnaphthalene disulfonic acid and dodecylbenzenesulfonic acid.

The resistance paste, prepared in a manner known per se, can contain soot, graphite or fire-resistant particles covered by pyrolytic carbon as conductive particles dispersed in the binder. In a preferred embodiment of the invention the electrically conductive particles have a pH value of between 6.5 and 8. Thus, it is assured that the cross-linking reaction is not initiated already prior to the processing of the resistance paste, as a result of which the processable consistency could possibly be unfavorably affected.

In a further development of the invention, the mixture contains a modified ester imide resin such as terephthalic and/or isoterephthalic ester imide resin. It enhances the capacity of the resistance paste to be subjected to screen printing. Up to 50% of the solids contained in the polymer binder can consist of modified ester imide resin. This enhances the flow properties of the resistance paste in such a way that even by means of screen printing, a resistance layer surface is obtained that—with respect to fixed resistors—is satisfactorily smooth.

Suitable imide resins include imide modified polyaddition resins and polyester imide resins.

In order to make the resistance layer chemically resistant to other substances such as, for example, alcohols, as well, in a further development of the invention, a binder can contain, besides the aforementioned mixtures thermosetting epoxy resin and/or polyurethane resin and/or polyacetal resin.

The thermosetting epoxy resin can, e.g., be one prepared from Bisphenol A. Suitable polyurethane resins can be, for example, based on a caprolactam blocked adduct of isophorondiisocyanate. The polyacetal resins can be, for example, a low viscosity polyvinyl butyral resin.

With the resistance paste described it is possible to produce a resistance layer, for example by means of a reverse laminating process. This process consists in applying a thick layer of resistance paste on an intermediate member and curing it at a temperature of about 230° C. This is followed by its relamination onto the final substrate consisting of polyester or epoxide.

By varying the polymer components of the binding agent, the hardness and flexibility of the layers formed from the binding agent can be controlled, which is of importance with use of flexible substrates.

It is also possible, however, to apply the resistance paste in form of a thick layer directly onto a film substrate, for example, by means of screen printing and curing the thick layer at a temperature of about 130° C., for example, for more than 12 hours.

A resistance layer produced from the resistance paste described is characterized in that at least one half of its binder consists of melamine and polyester resin.

Embodiment examples of the invention are described in the following.

DETAILED DESCRIPTION OF THE INVENTION

Example 1

A resistance paste was produced by mixing the following components:

40 parts by weight of dissolved, fully etherified melamine resin (hexamethoxymethylmelamine) in a 98% solution, e.g., Maprenal MF 900 (Hoechst), 40 parts by weight of oil-free dissolved polyester resin containing hydroxyl groups in a 50% solution, e.g., Aftalat VAN 4284 (Hoechst), 2 parts by weight of graphite, 8 parts by weight of carbon black (pH ab.7)

5 parts by weight of butyl glycol, 4 parts by weight of a catalyst, (e.g., p-toluene sulfonic acid), 2 parts by weight of a levelling agent, (Efca polyacrylate polymer 401, Efca Chemicals, Netherlands) and 1 part by weight of a wetting and dispersing agent Anti-Terra-U, a salt of unsaturated polyaminoamides and higher molecular acid esters (BYK-Chemie, Wesel, West Germany) the weight ratio of the solids contained in the melamine resin, the polyester resin and the catalyst being about 39:20:4. This resistance paste retains its processable consistency over a long period. From it a resistance layer can be produced that is thermally and electrically stable and resistant to organic substances such as Diesel fuel, gasoline, and hydraulic oil.

It has been found that 50% to 100% of the solids contained in the binder can consist of the fully etherified melamine resin and the polyester resin containing hydroxyl groups, with the melamine resin accounting for 30 to 50 parts by weight and the polyester resin accounting for 10 to 30 parts by weight.

The remainder of the solids contained in the binder, if any, can consist entirely of modified ester imide resin or entirely of thermosetting epoxide resin and/or polyurethane resin and/or polyacetal resin. Preferably, a mixture of 20 parts by weight of modified ester imide resin and 30 parts by weight of the other resins mentioned is used, e.g., the epoxide resin Beckopox 301. In this case, the solids contained in the binder consist of:

40 parts by weight of fully etherified melamine resin, 20 parts by weight of polyester resin containing hydroxyl groups, 20 parts by weight of modified ester imide resin, 30 parts by weight of other resins.

The amount of catalyst is chosen in accordance with the desired curing time and curing temperature. A relatively small amount of the catalyst is added if a high curing temperature of, for example, 230° C. and a short curing time of, for example, 30 minutes is desired. A relatively higher amount of the catalyst is added, if a low curing temperature of, for example, 130° C. and along curing time of, for example, 12 hours is desired.

The resistance paste is stored at, for example, 4° C. It is then available in a processable consistency for several years. Prior to processing, the viscosity of the resistance paste can be adjusted to the conditions of the processing method to be applied, for example, by screen printing, by adding a solvent, such as butyl glycol. Then a substrate can be coated by means of screen printing.

This coating process can also be accomplished by applying several layers of resistance pastes with different specific surface drags, provided necessary intermediate drying is carried out. This is followed by curing.

Example 2

A resistance paste, which is especially suitable for use with screen printing, is prepared by mixing the following components:

15.5 percent by weight of fully etherified hexamethoxymethylmelamine in 70% solution, 28 percent by weight of oil-free hydroxyl group containing polyester in 50% solution (Aftalat VAN 4284. Hoechst), 46 percent by weight of imide-modified polyaddition resin in 6.19 percent solution (Hoechst), 8 percent by weight of furnace soot, pH 7.5, 2 percent by weight graphite and 0.5 percent by weight of non-ionogenically blocked acid catalyst, such as toluenesulfonic acid.

2 percent by weight acrylate-copolymer solution (BYK-Chemie 358)

The mixture is rolled on a triple roller mill, with pressures of 30, 50 and 70 bar.

For purposes of screen printing, the viscosity of the paste mixture is modified by addition of butylcarbitol acetate to 9,500 centipoises. The solid content of the binder should consist to an extent of at least 50% of the foregoing listed ingredients.

Example 3

In a preferred embodiment the resistance paste contains about 75 percent of components of the mixture below and about 25 percent of a modified ester imide and epoxy resin which hardens on heating and/or polyurethane resin and/or polyacetal resin in a mixture of 2:3. A resistance paste suitable for preparation of resistance films which, in addition to the advantages mentioned above, shows resistance against alcohol, is prepared from the following ingredients:

34.5 percent by weight of the fully etherified hexamethoxymethylmelamine in 98% solution, 28.5 percent by weight of oil-free, hydroxy group containing polyester in 59 percent solution (Aftalat VAN 4238 Hoechst), 11 percent by weight of imide-modified polyaddition resin in 61.9 percent solution, 18.5 percent by weight of polyvinylbutyral in 55 percent solution, 6.5 percent by weight of carbon black (pH 6.8)

1 percent by weight of non-ionogenically blocked acid catalyst, e.g., p-toluenesulfonic acid and 3 percent by weight of dispersion additive (Efca 46, Efca Chemicals, Netherlands).

The viscosity of the paste is adjusted with butyl glycol.

What is claimed is:

1. A resistance paste comprising a polymer binder containing in dispersion electrically conductive particles and solvents, wherein more than half of the solids contained in the polymer binder consists of a mixture of:
    a) fully etherified melamine resin,
    b) polyester resin containing hydroxyl groups and
    c) an acidic catalyst.

2. The resistance paste according to claim 1, wherein the acidic catalyst is a non-ionogenically blocked catalyst setting free protons.

3. The resistance paste according to claim 1, wherein the electrically conductive particles have a pH value of between 6.5 and 8.

4. The resistance paste according to claim 1, wherein the mixture is of 30 to 50 parts by weight of said fully etherified melamine resin, 10 to 30 parts by weight of said polyester resin containing hydroxyl groups and 0.5 to 5 parts by weight of said acidic catalyst.

5. The resistance paste according to claim 4, wherein the mixture is of 40 parts by weight of said fully etherified melamine resin, 20 parts by weight of said polyester resin containing hydroxyl groups and 1 part by weight of said acidic catalyst.

6. The resistance paste according to claim 1, wherein the polymer binder further contains a modified ester imide resin.

7. The resistance paste according to claim 6, wherein up to 50% of the solids contained in the polymer binder consist of said modified ester imide resin.

8. The resistance paste according to claim 7, wherein the polymer binder contains about 20% by weight of said modified ester imide resin.

9. The resistance paste according to claim 1, wherein the polymer binder additionally contains thermosetting epoxide resin, polyurethane resin, or polyacetal resin.

10. The resistance paste according to claim 6, wherein the polymer binder additionally contains thermosetting epoxide resin, polyurethane resin, or polyacetal resin.

11. The resistance paste according to claim 1, wherein said fully etherified melamine resin is a melamine-methylol alkyl ether resin.

12. The resistance paste according to claim 1, wherein said polyester resin containing hydroxyl groups is a linear or branched-chain polyester resin containing hydroxyl groups or a saturated polyester resin containing hydroxyl and carboxyl groups.

13. The resistance paste according to claim 1, wherein said acidic catalyst is an aryl sulfonic acid.

14. The resistance paste according to claim 1, wherein said electrically conductive particles include soot, graphite or fire-resistant particles covered by pyrolytic carbon.

15. The resistance paste according to claim 4, wherein said fully etherified melamine resin is a melamine-methylol alkyl ether resin, said polyester resin containing hydroxyl groups is a linear or branched-chain polyester resin containing hydroxyl groups or a saturated polyester resin containing hydroxyl and carboxyl groups, and said acidic catalyst is an aryl sulfonic acid.

16. The resistance paste according to claim 6, wherein said modified ester imide resin is terephthalic or isoterephthalic ester imide resin.

* * * * *